United States Patent
Van Der Hoeven et al.

(10) Patent No.: US 6,177,036 B1
(45) Date of Patent: *Jan. 23, 2001

(54) PROCESS FOR FORMED ARTICLE PRODUCTION BY EXTRUSION

(75) Inventors: Jos Van Der Hoeven, Heel; Hub A. G. Vonken, Weert, both of (NL)

(73) Assignees: Hoechst Aktiengesellschaft, Frankfurt (DE); Mitsui Petro-Chemical Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/728,985

(22) Filed: Oct. 11, 1996

(30) Foreign Application Priority Data

Oct. 13, 1995 (DE) .............................. 195 38 160

(51) Int. Cl.$^7$ .............................................. B29C 44/20
(52) U.S. Cl. ................. 264/45.9; 264/45.3; 264/48; 264/50; 264/53; 264/54; 264/288.8
(58) Field of Search ........................... 428/131, 137, 428/138, 314.2, 315.5, 521; 521/142, 73, 79, 134, 140, 150; 526/72, 283, 308; 264/50, 53, 54, DIG. 5, 48, 288.8, 45.3, 45.9

(56) References Cited

U.S. PATENT DOCUMENTS

| | | |
|---|---|---|
| 3,694,385 | 9/1972 | Salyer et al. ............ 260/2.5 A |
| 5,087,677 | 2/1992 | Brenkner et al. ............ 526/160 |
| 5,140,053 * | 8/1992 | Vamamoxoexal ............ 521/142 |
| 5,204,429 * | 4/1993 | Kaminsky et al. ............ 526/308 |
| 5,324,804 | 6/1994 | Steinmann ............ 526/313 |
| 5,618,853 * | 4/1997 | Vonken et al. ............ 521/60 |

FOREIGN PATENT DOCUMENTS

| | | |
|---|---|---|
| 0 090 507 | 10/1983 | (EP) . |
| 0 642 907 | 7/1994 | (EP) . |
| 0 642 907 | 3/1995 | (EP) . |
| 54-31026 | 10/1979 | (JP) . |
| 3-57348 | 8/1991 | (JP) . |
| 6-107837 | 4/1994 | (JP) . |
| 90/14159 | 11/1990 | (WO) . |

OTHER PUBLICATIONS

XP-002074929 Database WPI Section Ch. Week (Apr. 19, 1994).

* cited by examiner

*Primary Examiner*—Allan R. Kuhns
(74) *Attorney, Agent, or Firm*—Foley & Lardner

(57) ABSTRACT

A plastic foam article 1 produced by extrusion, for example, a plastic foam sheet comprising homopolymers and copolymers of polycyclic olefins, contains at least 10% by volume of open cells 2, 4 which have a polyhedron-like shape and adjoin one another. The deformation-free opening of the cells is brought about by means of an extrusion temperature higher than that for the extrusion of thermoplastic plastic foam articles having a closed-cell structure. This leaves webs 3 of cell walls 5, 6 intact in terms of shape, whether they now have openings 7 or have no through passages, so that the mechanical strength of the cell framework or the three-dimensional matrix is retained.

15 Claims, 4 Drawing Sheets

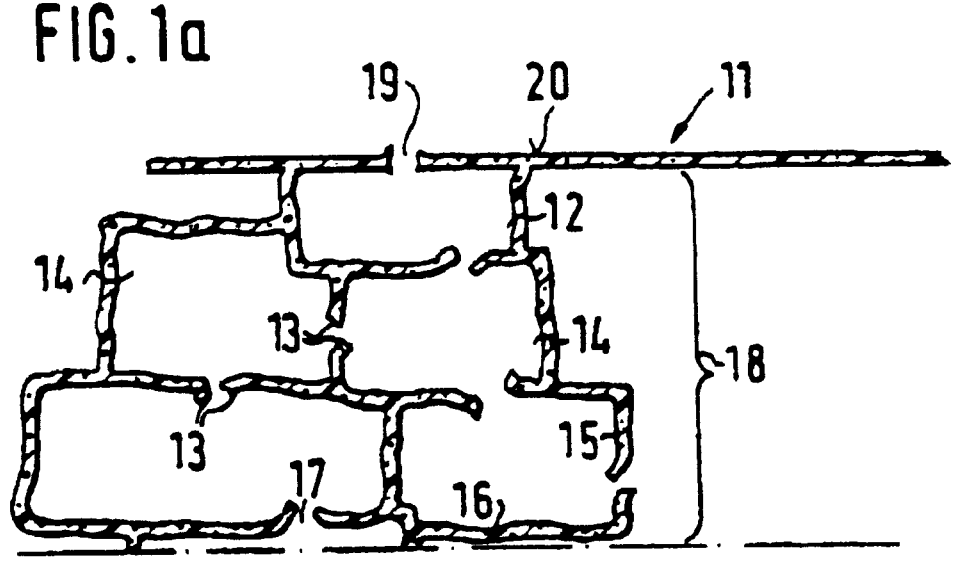
"PRIOR ART"
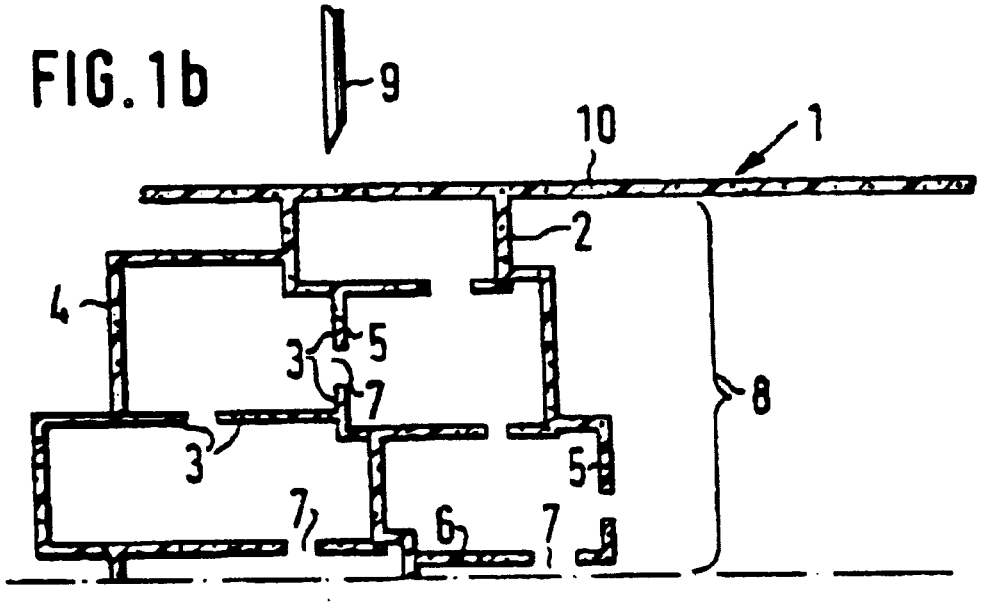

Fig. 3a
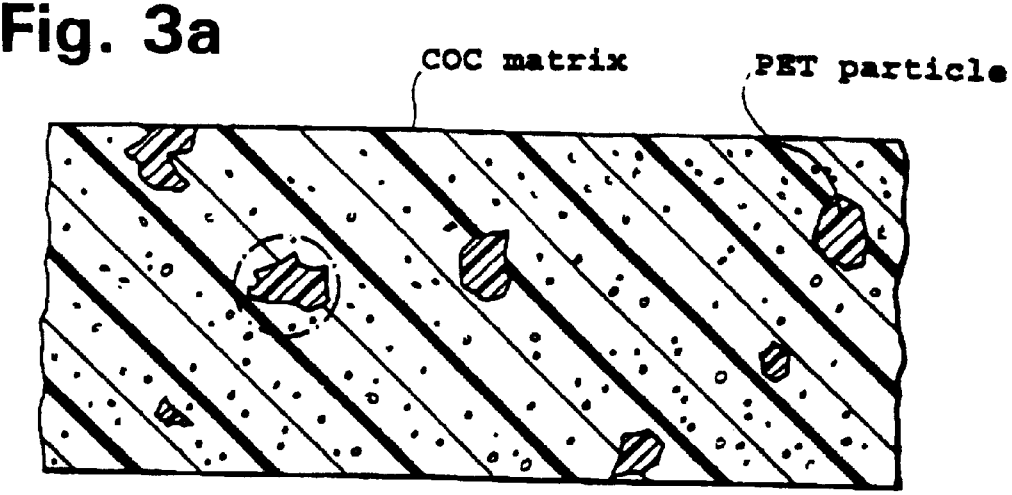
Fig. 3b
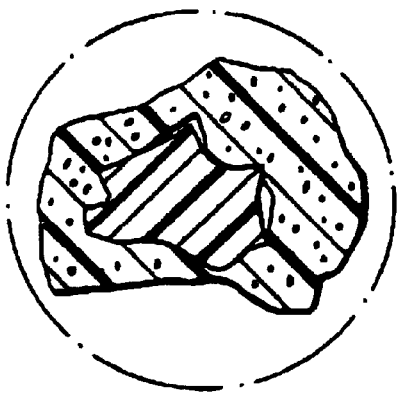
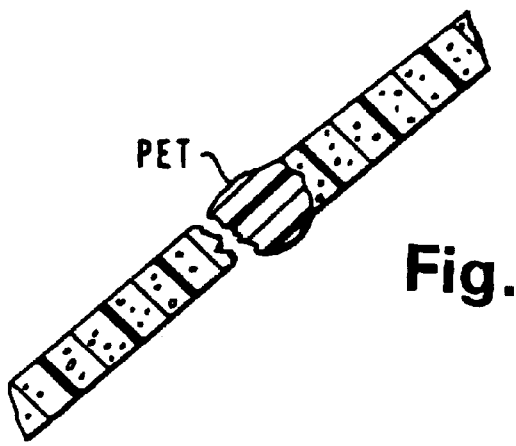
Fig. 3c

PROCESS FOR FORMED ARTICLE PRODUCTION BY EXTRUSION

BACKGROUND OF THE INVENTION

1. Field of the Invention

The present invention relates to a plastic foam article comprising a thermoplastic synthetic foam containing at least 10% by volume of open cells which have a polyhedron-like shape and adjoin one another, wherein webs of the polyhedron-like cells arranged in a three-dimensional matrix are intact in terms of shape and at least two walls of each open cell have openings, with maintenance of the mechanical strength of the three-dimensional matrix. The present invention also relates to a process for producing a plastic foam article and use of the shaped article.

2. Description of Related Art

EP-A 0 642 907 discloses shaped articles which are constructed from an open-celled plastic foam sheet which, in contrast to a plastic foam sheet having closed cells, is able to take up liquids in its interior.

Plastic foam sheets have been known for a long time, polystyrene foam sheets in particular have found a wide range of applications. They are used, for example, as packaging and in the building sector especially as insulation material, for example, as wall-paper underlays.

Plastic foam sheets are generally produced by extruding a thermoplastic polymer together with a blowing agent, in particular a blowing gas, from an annular or wide slot die or a coextrusion die. Shortly after leaving the extrusion die, the blowing agent finely distributed in the plastic expands so that very fine bubbles are formed in the plastic foam body. The size of the bubbles obtained depends on the temperature conditions and the extrusion rate. Accordingly, the plastic foam sheet thus produced contains densely packed, closed, gas-filled cells, with the gas enclosed in the cells generally being air and/or residues of the blowing agent. The excellent insulation properties of the plastic foam sheets are essentially based on the densely packed, closed, gas-filled cells which to a certain degree form an "immobile" gas layer, in particular air layer. Such a fixed air layer has a low thermal conductivity.

An entirely different behavior is shown by a plastic foam sheet in which the cells are not closed, but open, i.e., the cells are in fluid communication. Such a plastic foam sheet can, for example, store liquids in a similar manner to a sponge. In such open-celled foams, the cells are connected to one another via the gas phase. In the extreme case, they consist only of cell webs.

The document WO 90/14159 describes an oil absorbent material comprising comminuted polyethylene foam, but this document gives no indication as to how an intact absorbent plastic foam sheet is to be obtained. Application of mechanical pressure to the plastic foam sheet enables a large part of the previously closed cells of the polyethylene foam to be opened. However, this significantly reduces the mechanical strength and the stability of the plastic foam sheet, since the cell walls are partly deformed by the mechanical pressure. Such a sheet can have a proportion of open cells of more than 50%.

EP-A-0 090 507 discloses a dish-shaped packaging for fast food which comprises an open-celled, foamed polymer layer and a closed-cell, polymeric outer layer as liquid barrier layer. The polymer used for both layers is, for example, polystyrene. The formation of the open-celled plastic foam sheet is here carried out in the same manner as the extrusion of the closed-cell outer layer, with the one exception that an excess of nucleating agent, for example, sodium bicarbonate and citric acid, is added in a weight ratio of from 0.8 to 1.2 and from 1.2 to 0.8, but the use of a blowing agent is omitted. Since no blowing agent is used, only a single mixing chamber and a single extrusion screw are required. In this known process, an open-celled polystyrene foam layer having a mean proportion of open cells of from 50 to 90% by volume is obtained. However, this known process does not give a cell structure in which the individual cells are connected to one another; instead, only the cells in the surface of the plastic foam sheet are connected to the adjacent cells lying underneath, but without giving a cell structure in which the cells directly adjoin one another and are separated only by the cell walls.

Japanese Patent 3-57348 discloses a moisture-absorbing packaging material comprising a shaped body which consists of a homogeneous mixture of from 50 to 85% by weight of ethylene polymer and from 15 to 50% by weight of an adsorbent which does not swell on taking up water.

Japanese Patent 54-31026 describes a process for producing a polypropylene foam having an open-celled structure, in which process homopolymers or copolymers of propylene are gelled under pressure and heat, with addition of chlorofluorocarbons as blowing or foaming agents and a conventional nucleating agent. The extruded polypropylene foam has a uniform and fine cell structure with a mean cell diameter of 0.5 mm and a density of about 0.028 g/cm$^3$. The absorption capacity of this polypropylene foam for water is 3 to 7.6 times the foam density.

SUMMARY OF THE INVENTION

One object of the invention is to provide a plastic foam article comprising a plastic foam having a high purity, exceptionally low water absorption, excellent barrier action against water vapor, very good hydrolysis resistance and very good electrical insulation properties, and having an open cell structure which can be varied within wide limits, with the cells being connected to one another without mechanical destruction of cell walls, and with media or fluid being able to pass through the cells located in the interior of the shaped article.

Another object of the invention is to provide a process for the production of a plastic foam article by an extrusion method. Still another object of the present invention is to provide a plastic foam article produced by the extrusion method. Yet another object of the present invention is to provide a packaging material, suction filter, electrical insulation and thermal insulation made of the plastic foam article.

In accomplishing the foregoing objects, there has been provided according to one aspect of the present invention, a plastic foam article comprising a synthetic thermoplastic polymer foam which contains:

polyhedron-like shaped cells disposed within the thermoplastic polymer and occupying at least 10% by volume of the thermoplastic polymer, said cells having walls, and at least two walls of each of said cells having openings, such as, for example, holes, therein to form an open cell;

webs formed by said cell walls arranged next to each other;

a space matrix within the thermoplastic polymer foam defined by said cells and webs, wherein said space matrix maintains its form in an undamaged configuration and is neither mechanically nor thermally deformed, and wherein the thermoplastic polymer comprises one or more cycloolefin homopolymers and/or copolymers.

Another aspect of the present invention provides a process for producing a plastic foam article comprising a thermoplastic synthetic foam which contains at least 10% by volume of open cells, said process comprising:

melting a polymer mixture comprising at least one cycloolefin homo- and/or co-polymer and a nucleating agent and optionally a foreign polymer in a first extrusion step at a temperature of up to 320° C.;

injecting a blowing agent into the polymer melt under a high pressure of up to 350 bar at the end of the first extrusion step and mixing it homogeneously with the polymer melt;

cooling the polymer melt in a second extrusion step to a composition temperature which is determined, based on the composition of the plastic foam, to provide an open-celled film upon extrusion.

Yet another aspect of the invention provides a plastic foam article produced by the process of the present invention. Still another aspect of the invention provides a suction filter for polar and/or nonpolar liquids which comprises the plastic foam article configured in the shape of a suction filter.

Still another aspect of the present invention provides an electrical insulation material which comprises the plastic foam article, which does not include any wetting agent. Yet another aspect of the present invention provides a thermal insulation material which is flame-resistant up to 170° C., which comprises the plastic foam article.

Further objects, features and advantages of the present invention, will become apparent from the detailed description of preferred embodiments which follows.

BRIEF DESCRIPTION OF THE DRAWINGS

FIG. 1a shows a schematic cross section of a known plastic foam article having an open cell structure in which the cells are opened by mechanical pressure.

FIG. 1b shows a schematic cross section of a plastic foam article having an open cell structure according to the invention.

FIGS. 3a, 3b and 3c schematically show the arrangement of foreign polymer particles in the cell structure or in a cell wall of a plastic foam article.

DETAILED DESCRIPTION OF THE PREFERRED EMBODIMENTS

Figure 2:
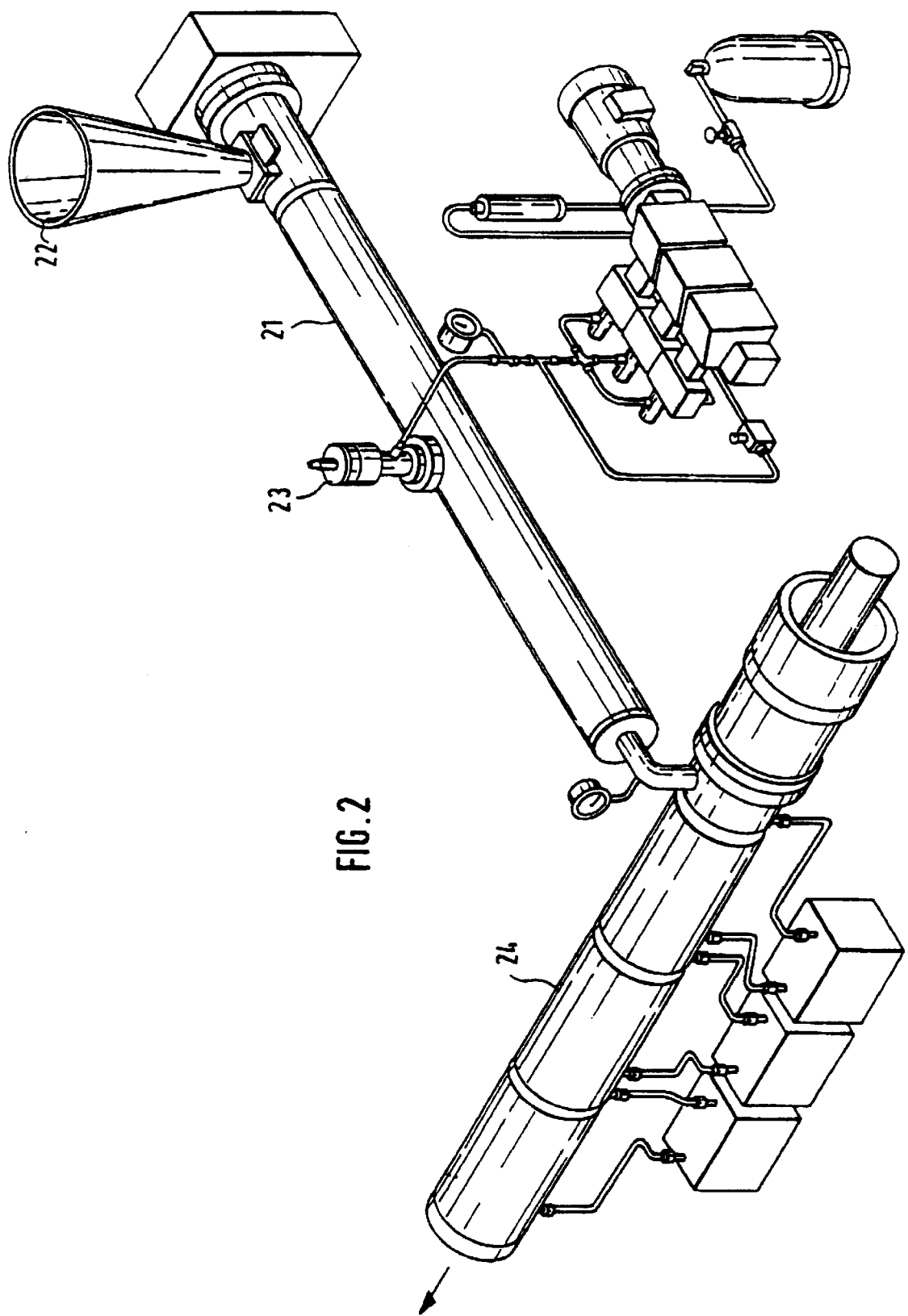
FIG. 2 shows a perspective view of a tandem extrusion unit for producing open-celled plastic foam article according to the invention.

The present invention comprises a plastic foam article of the type described above. The starting materials for the plastic foam are a base polymer, optionally a foreign polymer, nucleating and blowing agents. The base polymer is selected from the group consisting of homopolymers and copolymers of polycyclic olefins and mixtures and blends thereof. As used herein, "plastic foam article," "plastic foam sheet" and "shaped article" are used interchangeably and refer to plastic extruded foams which may or may not be subject to further shaping after extrusion.

The homopolymers and copolymers of polycyclic olefins are generally amorphous, transparent copolymers based on cycloolefins and ethylene. Hereinafter, except where otherwise noted, these polymers and blends or mixtures thereof are collectively referred to as "COC polymers", or more simply "COCs".

COCs and processes for their preparation are disclosed in U.S. Pat. No. 5,087,677 (Brekner et al., issued Feb. 11, 1992) and U.S. Pat. No. 5,324,804 (Brekner et al., issued Jun. 28, 1994). These patents, including their specifications, drawings, claims and abstracts are included herein by reference.

In a preferred embodiment of the invention, at least part of one of the closed smooth surfaces of the shaped article is preferably open so that the cells adjoining the surface and the cells located in the interior of the three-dimensional matrix are accessible to liquids.

In another embodiment of the invention, the plastic foam comprises using a non-thermoplastic polymers along with the COC polymers.

The starting materials of the plastic foam are at least one polymer and a blowing gas and/or a nucleating agent. The nucleating agent can also serve as blowing gas and, vice versa, the blowing gas can serve as nucleating agent. At least one polymer and a blowing gas are required as starting materials, to which a cell structure regulator may be added if necessary. In particular, the base polymer is preferably a COC polymer preferably in an amount of up to 99.75% by weight, the nucleating agent is preferably talc, chalk, sodium carbonate, sodium bicarbonate and/or citric acid generally in an amount of up to 3% by weight, and the blowing agent is preferably butane, propane, $CO_2$ or mixtures thereof generally in an amount of up to 5% by weight. The proportions by weight of the individual constituents generally depend in a specific case on the type of extruder employed.

In one embodiment of the invention, a certain amount by weight of the base polymer may be replaced by a foreign polymer in a weight by weight of the same order of magnitude.

Changing the amounts by weight of the starting materials of the plastic foam sheet enables the proportion of the open-celled structure to be varied within wide limits. Further treatment makes a sheet less open-celled on the treated side than on the untreated side. The invention achieves the important advantage that the rigid plastic foam sheet, even when the proportion of open-celled structure is at least 50% by volume, has mechanical properties such as tensile strength and elastic modulus which are virtually no different from the same properties of a similar plastic foam sheet having a predominantly closed-cell structure. This is attributable to the fact that although the cells of the plastic foam sheet are open, the actual cell framework is retained and is neither mechanically nor thermally deformed or destroyed.

For the purposes of the present invention, the term "cells" is defined as the voids present in the plastic foam sheet. These cells are closed when the cell walls enclosing the void comprise plastic which is not perforated or otherwise permeable to a medium. Reference to open cells means that at least two of the cell walls enclosing the void have openings, so that material, in particular a liquid medium, can be exchanged between adjacent cells.

The number of closed or open cells can be established in accordance with standardized methods for determining the proportion by volume of open and closed cells in rigid foams (e.g., in accordance with DIN standard 4590, which is incorporated by reference in its entirety). The percentage by volume given for open cells is then in each case based on the total volume of a representative volume unit.

According to one objective, there is also to be provided a process for producing shaped articles comprising a plastic foam. The process has, compared with the conventional extrusion process for plastic foam sheets having a closed cell structure, slight but significant modifications of the process steps. This is achieved by the polymer mixture comprising at least one COC polymer and at least one nucleating agent and optionally a foreign polymer being melted in a first extrusion step at a temperature of up to 320° C., by a blowing agent being injected into the polymer melt under a high pressure of up to 350 bar at the end of the first extrusion step and being homogeneously mixed with the polymer melt. In a second extrusion step, the polymer melt is cooled to a composition temperature in the region of the lower limit of the pseudoplastic viscous temperature range, e.g., preferably from 120° C. to 260° C., directly prior to extrusion. In embodiments which have the absence of foreign polymer, the composition temperature is from 10 to 20% higher than the composition temperature during extrusion of closed-cell plastic foams. In embodiments which include the addition of a foreign polymer the composition temperature is lowered to the temperature which is required in the extrusion of closed-cell plastic foams comprising COC polymers.

In a further embodiment of the process, at least one of the surfaces of the extruded shaped article may be partly opened by mechanical treatment such as scraping, scoring or perforating, or by cooling and simultaneous stretching on exit from the extrusion die. As noted above, in one embodiment of the process, a certain amount by weight of the COC polymer is replaced by an amount by weight of the same order of magnitude of a foreign polymer and the wettability of the foreign polymer in the COC polymer melt is virtually zero.

The shaped article thus produced can be used as packaging materials, in particular for pharmaceuticals, as suction filters, as electrical insulation materials, with this listing of the possible uses being in no way comprehensive, but only being given by way of example.

Depending on the temperature gradient in a direction perpendicular to the surface of the foam sheets, during extrusion of the plastic foam sheets, the open cells are located at a greater or lesser depth in the interior of the foam sheet, with one surface already having an open-celled structure without further treatment, while the other surface is closed. Further treatment for achieving the open-celled nature of one of the surfaces of the sheet is therefore unnecessary.

The invention is illustrated below with the aid of the drawings.

FIG. 1a shows a schematic cross section through a shaped article 11 which is obtained by extrusion of a plastic melt according to the prior art and subsequent mechanical pressure stressing of the extruded plastic foam sheet. During foaming of a thermoplastic such as polystyrene, a sheet having a closed cell structure is formed in the previously known processes. Polystyrene can be processed by extrusion to give various foam products having a closed cell structure. This is done using different blowing agents and nucleating agents in order to achieve desired product properties. The cell size, density and structure of the plastic foam and the degree to which open cells are obtained can be varied as required using process variables and additives. The closed-cell plastic foam to be produced is used in different areas, with use being made of specific properties such as low density, insulation capability and deformability.

By means of the mechanical pressure stressing of a surface 20 of the shaped article 11, the initially closed cells 12 which directly adjoin the surface 20, and also the cells 14 lying underneath them, are mechanically broken open so that openings 17 are formed in the cell walls 15 and 16. In this procedure, webs 13 of the cell walls are deformed mechanically to such an extent that the individual cells and the three-dimensional matrix 18 of the shaped article lose their mechanical strength. This can lead to the outer layers of the shaped article 11 comprising a rigid foam collapsing and thus making the plastic foam sheet soft. The above explanations also apply to flexible foams of polyethylene and foams derived therefrom.

FIG. 1b shows a shaped article 1 according to the invention comprising a thermoplastic polymer in which the cells 2 and 4 have a polyhedron-like shape with preferably a maximum dimension of $\leq 1.0$ mm, in particular $\leq 0.4$ mm, and adjoin one another. Within the scope of this disclosure, the term 'polyhedron-like shape' is defined as denoting a polyhedric body which does not have the shape of a perfect polyhedron, such as those shown in the drawings. A surface 10 of the shaped article 1 is generally initially closed but is opened by mechanical treatment such as scraping, scoring, perforating or by cooling and simultaneous stretching during extrusion. Perforating preferably comprises needling the surface 10 with a needle-shaped tool 9. The cells 2 and 4 form a three-dimensional matrix 8 or a cell framework and are generally substantially intact in terms of shape, i.e., cell walls 5 and 6 which are provided with openings 7 and have substantially no mechanical deformation and preferably no mechanical deformations at all. Two walls 5, 6 of each open cell 4 have such openings 7. On both sides of each opening 7 there are webs 3 which, in comparison with the shaped article 11 in FIG. 1a are not deformed. The reference numeral 2 designates the cells directly adjoining the surface 10, while the cells lying underneath them are denoted by the reference numeral 4.

FIG. 2 shows, by way of example, a perspective view of an extrusion unit for producing the shaped article 1 according to the invention. This unit is generally not different from a conventional unit for producing closed-cell plastic foams. A first extruder 21 is charged via a feed funnel 22 with plastic granules mixed with a nucleating agent. In the screw extruder, the mixture of plastic granules and nucleating agent is homogeneously mixed and, depending on the type of plastic granules, the mixture is melted by heating to a temperature of up to 320° C.

The plastic melt is treated in the first extruder 21 with a blowing agent via a blowing agent injector 23 under a high pressure of up to 350 bar. This blowing agent is homogeneously mixed with the plastic melt and fed to a second extruder 24 in which the plastic melt is cooled to a composition temperature in the region of the lower limit of the pseudoplastic viscous temperature range, e.g., from 120 to 260° C., prior to extrusion. In one embodiment, this composition temperature is from 10 to 20% higher than the composition temperature during extrusion of plastic melts to give closed-cell plastic foams. For example, the composition temperature of a plastic melt based on COC polymers is about 200° C., while the composition temperature of COC polymers on exit from the extrusion die is about 175° C. The temperature is one of the control variables. In addition, it is also possible to employ variables such as density, cell size and die pressure.

In the production of closed-cell plastic foams, the pressure of the blowing agent or blowing gas is generally at from about 170 to 175° C. during exit from the extrusion die causes the plastic melt to be converted by cooling from the plastic to the approximately elastic state. Here, rapid vaporization and foaming of the blowing agent and a temperature drop of about 20° C. occurs at the extrusion die. The extruded plastic foam then slowly cools further.

The formation of a closed-cell and open-celled structure in a plastic foam depends essentially on the temperature of the plastic melt at the annular extrusion die according to one embodiment. The cells of the plastic foam remain largely closed up to a temperature of about 175° C. At higher temperatures of the melt at the exit of the annular extrusion die, cells of the foam begin to open and at a melt exit temperature of about 195° C. the cells are mostly open. The temperature range for producing closed-cell COC polymer foams is from 160 to 185° C. To the base raw material COC polymer there is added as a nucleating agent, an endothermic and self-nucleating blowing agent having a 70% active content in LDPE as carrier, for example, Hydrocerol CF 70 from Boehringer/Ingelheim, Germany, or talc. The active component of Hydrocerol CF 70 comprises sodium bicarbonate and citric acid. The starting materials for the foam can also be COC granules, Hydrocerol CF 70 or talc as nucleating agent and a foreign polymer.

An open-celled structure of the COC foam can be achieved either: (1) by appropriately increasing the exit temperature of the melt at the annular extrusion die as noted above, or (2) by addition of a foreign polymer to the standard formulation of the COC foam in the usual temperature range from 160 to 185° C., in particular 175° C.

In the case of the higher temperature for achieving an open-celled polymer foam, the temperature generally has to be from 10 to 20% higher than the temperature during extrusion of closed-cell polymer foams as explained above. As a result of the higher temperature at the extrusion die, with otherwise identical conditions and formulations as in the production of closed-cell plastic foams, the blowing agent enclosed in the cells leads to uniform opening of the soft cell wall. In the cooling phase outside the extrusion die, a skin then covers the plastic foam sheet. If the surface of this plastic foam sheet is scraped, scored or needled, i.e., mechanically perforated, this exposes the open-celled structure which is suitable for taking up nonpolar liquid, i.e., oil-like liquids. Opening of the surface is likewise obtained by cooling and simultaneously stretching of the extruded plastic foam article.

The higher temperature setting lowers the viscosity and the cell walls open as a result of the increased gas pressure, without bursting and without deformation, thus bringing about the open-celled structure. Even if the cells close to or at the surface as a result of further cooling and have to be opened by mechanical treatment, the cells in the interior of the plastic foam sheet do not close, i.e., they continue to remain open.

The thermoplastic polymers which can be processed into plastic foam are polymers selected from the group consisting of polyolefins such as copolymers based on cycloolefins and ethylene (COCs) and homopolymer COCs as discussed above. Also useable are COCs in mixture with polyethylene (HDPE, LDPE, LLDPE), chlorinated polyethylene, polypropylene (PP), polypropylene copolymers (PPCs), ethylene-vinyl acetate copolymer (EVA), halogenated polyolefins; from the group consisting of styrene polymers such as polystyrene (PS), polystyrene copolymers (PSCs), acrylonitrile-butadiene-styrene copolymers (ABS), styrene-maleic anhydride, high-impact polystyrenes (HIPS); from the group consisting of polyesters such as polyalkylene terephthalate; from the group consisting of ethylene-propylene terpolymers, polyvinyl chloride (PVC) and/or polyphenylene oxide. This listing is only by way of example and does not claim to be comprehensive.

The abovedescribed COC base polymers are amorphous, transparent copolymers based on cycloolefins and ethylene.

COCs are a new class of polymeric materials whose property profile can be varied within a wide range during polymerization. They have an exceptionally low water uptake, excellent barrier action against water vapor, heat distortion resistance up to 170° C., very good hydrolysis stability, very good resistance to acids and alkalis and very good electrical insulation properties. Thermoplastic processability or the flowability are excellent, likewise the stiffness, strength and hardness of the processed COCs. COC is supplied in various forms, for example, by Hoechst, Federal Republic of Germany. Owing to their olefinic character, all types of COC are resistant to hydrolytic degradation and to the action of acids and alkalis and also polar solvents such as methanol. In particular, COCs are chemically resistant to methanol, ethanol, isopropanol, acetone, butanone and benzaldehydes. COC is attacked by nonpolar organic solvents such as toluene or petroleum spirit. COC may be used in the presence of various chemicals only with precise knowledge of the requirement profile and in the case of doubt the behavior must be checked in a practical test. Since COCs are generally exceptionally pure and on contact with water or isopropanol no substances are leached out after 24 hours at 70° C. within the detection limits, in addition have an excellent barrier action against water vapor and exceptionally low water uptake, they are particularly suitable for medical applications, e.g., for packaging pharmaceuticals. The COCs are likewise suited to the packaging of foodstuffs or very hygroscopic goods. When using the COCs as electrical insulation material, they should be substantially free of wetting agents such as alkylsulfonate.

It is likewise possible to produce plastic foams from thermoplastic polymers or blends of thermoplastic and non-thermoplastic polymers, from polymers, copolymers or blends of thermoplastic polymers and/or copolymers. Such blends can, for example, consist of COC/polyethylene, COC/polybutylene, COC/polyethylene/polybutylene polymers.

The starting materials for the plastic foams are generally in each case granules, powder or masterbatch comprising one of the abovementioned polymers, copolymers or blends, nucleating agent and blowing agent.

According to another embodiment, to produce the open-celled extruded COC foams, a certain amount by weight of the COC can also be replaced by a foreign polymer in an amount by weight of the same order of magnitude. In general, the amount by weight of the foreign polymer is less than the amount by weight of the COC and is in the order of from 0.15 to 15% by weight, in particular 10% by weight. Depending on the type of extruder, it may also be necessary to increase the proportion of foreign polymer to above 10% by weight up to 15% by weight. To these starting materials it is also possible to add additives such as wetting agents in order to increase the uptake capacity or the absorption capability for, in particular, polar liquids. The densities of the plastic foams are generally in the range from 0.02 to 0.350 g/cm$^3$, preferably from 0.07 to 0.240, in particular from 0.085 to 0.230 g/cm$^3$, while the uptake capacity for polar liquids is generally from 1 to 30 times, in particular from 4 to 10 times the foam density and for other liquids is generally from 4 to 7 times the foam density.

The foreign polymer is selected on the basis of it having only a very low affinity to the polymer matrix, i.e., the wettability of the foreign polymer in the polymer matrix is virtually zero. A possible explanation of the mechanism of action of the foreign polymer is given below, but other hypotheses on the mechanism of action should in no way be ruled out.

In this context, the term "foreign polymer" is an amorphous, crystalline or partly crystalline thermoplastic which, owing to its incompatibility with the base polymer, forms a dispersed phase in the polymer foam matrix. The morphological form is a droplet-shaped structure as is shown in FIGS. 3a and 3b. This structure comprises a COC foam matrix with inclusions of the foreign polymer, in the present case polyethylene terephthalate particles. As the enlarged view in FIG. 3b of such a PET particle in the COC foam matrix shows, the adhesion forces at the phase boundaries between the COC foam matrix and the polyethylene terephthalate particle are very low. In the foam formation process, during which the cell walls are greatly stretched, crack formation occurs at the phase boundary, which, especially in the case of very thin cell walls, leads to the open-celled structure of the COC foam.

The crack formation in a cell wall is shown in detail in FIG. 3c. The cell wall thickness is about 3 $\mu$m and it is easy to see that as a result of the crack formation at the phase boundary of the two different polymers the shape of the cell wall is largely retained and is not deformed.

The foreign polymer is generally selected from the group consisting of polyethylene terephthalate, polystyrene, polymethyl methacrylate, polyurethane and polytetrafluoroethylene. The foreign polymer can be added as granules, masterbatch or powder and its proportion by weight in the polymer melt is generally in the range from 0.15 to 15% by weight preferably from 8 to 12% by weight. When a foreign polymer is added to the starting materials of the polymer melt to be prepared, the optimum temperature of about 175° C. at the exit of the extrusion die can be maintained.

Blowing agents used are generally saturated, unsaturated or cyclic hydrocarbons, halogenated hydrocarbons, alcohols, water, nitrogen, carbon dioxide or mixtures thereof. The blowing agents are preferably selected from the group consisting of methane, ethane, ethene, propane, propene, n-butane, 1-butene, 2-butene, isobutane, isobutene, n-pentane, isopentane, 2,2-dimethylpropane and cyclopentane. Thus, for example, the blowing agent can be a mixture of propane and n-butane in a weight ratio of from 30 to 80% by weight of propane to from 20 to 70% by weight of n-butane; it is likewise possible, particularly in the production of COC foam, to use only n-butane.

In one preferred embodiment, the blowing agent is n-butane in an amount of from 2.10 to 4% by weight of the starting materials of the polymer melt.

As nucleating agent, carbon dioxide, water, nitrogen, talc, chalk, sodium carbonate, sodium bicarbonate and/or citric acid are generally added in an amount of from 0.1 to 5% by weight of the polymer melt.

Without addition of a wetting agent, the plastic foam sheets obtained are generally already suitable for absorbing nonpolar liquids, i.e., oil-like liquids. The behavior with regard to the absorption of polar liquids such as water is different, since the water droplets generally assume a near-spherical shape because of their surface tension and as a result the phase boundary angle between the surface of the plastic foam sheet and the droplets of the polar liquid is usually too great, so that absorption of the polar liquid does not occur. To decrease the phase boundary angle between a polar liquid and the cell walls or the surface of the plastic foam sheet, wetting agents comprising cationic, anionic, amphoteric or nonionic compounds are preferably added to the polymer melt. These wetting agents can be, for example, alkylsulfonates of which one is added in masterbatch form, for example, to a COC melt. The proportion of the alkylsulfonate(s) in the melt is generally from 0.1 to 10% by weight, in particular from 0.5 to 5% by weight.

To increase the absorption rate of polar liquids, one of the surfaces of the plastic foam sheet can be, for example, subjected to a corona or corona-aerosol treatment. It is likewise possible to apply a molecular coating to one of the surfaces of the plastic foam sheet by the mist process, in order to increase the absorption rate for polar liquids and to selectively absorb a polar or nonpolar constituent from an aqueous liquid, emulsion or the like.

The open-celled plastic foam sheets obtained can be produced in various thicknesses and can be processed into plates, profiles and blocks. They are used especially as suction filters, packaging of pharmaceuticals, electrical insulation material, moisture-absorbing material and the like.

FIGS. 4a to 4f show enlarged, schematic cross-sectional views of cell structures of plastic foam sheets and their liquid-absorption behavior is indicated.

Figure 4A:
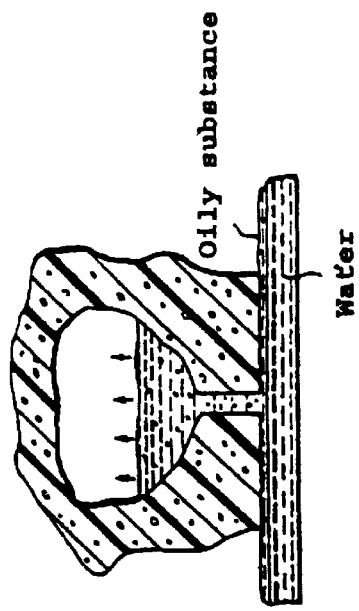
FIGS. 4a, 4b, 4c, 4d, 4e and 4f show enlarged schematic cross-sectional views of cell structures of plastic foam article and their liquid-absorption behavior.

FIG. 4a shows an open-celled COC foam which has been produced using the base formulation given below in the examples. The starting materials of this COC foam are COC granules and Hydrocerol CF 70 as nucleating agent. The open porosity is achieved by the increased temperature at the exit of the extrusion die. As can be seen from FIG. 4a, such a COC foam has a great absorption capability for a nonpolar liquid, for example, an oil, which is the same as saying that this liquid can readily flow from the foam surface into the interior of the open cells.

Figure 4C:
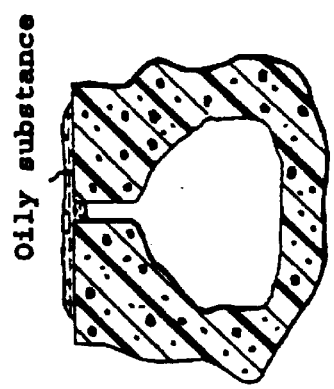
Figure 4E:
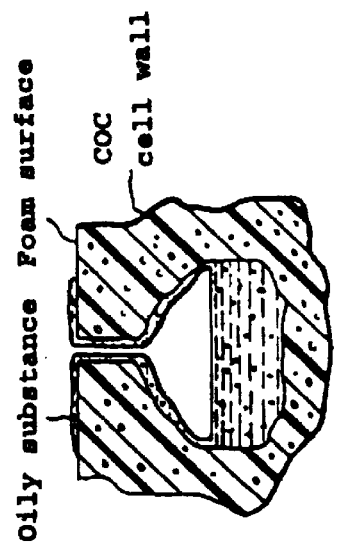
Figure 4B:
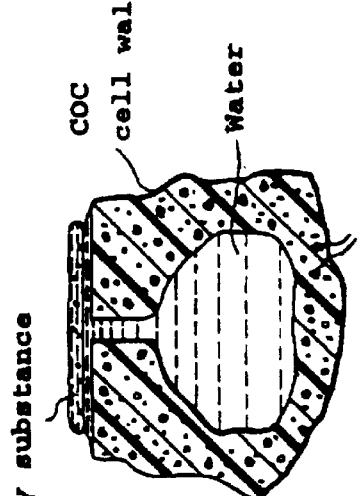

The absorption behavior for a polar liquid such as water is different, as can be seen from FIG. 4b. Owing to the high surface tension of the water droplet, a relatively large phase boundary angle is formed between the surface of the COC foam and the water droplet, which largely prevents penetration of the water droplet into the open cells. The same absorption behavior for nonpolar and polar liquids is also shown by open-celled COC foams in the production of which a foreign polymer has been added to the base formulation and the temperature at the extrusion die is from about 190 to 195° C.

Figure 4D:
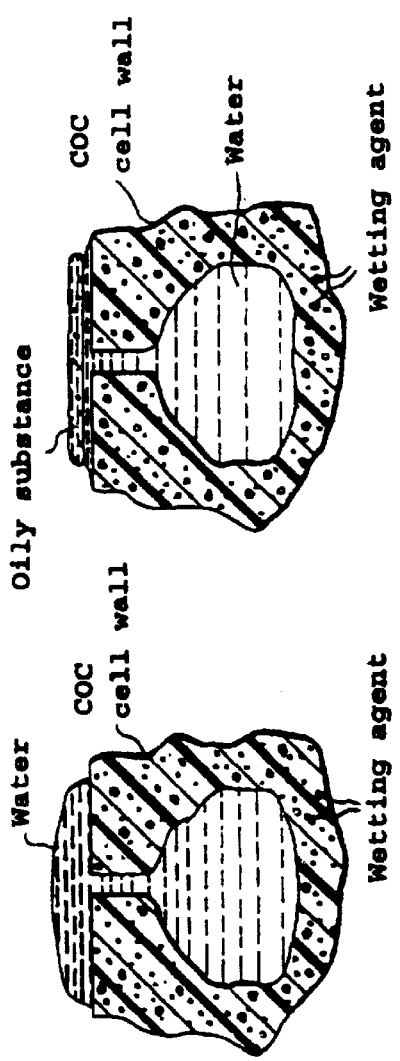

FIGS. 4c and 4d show the absorption behavior for polar and nonpolar liquids when a wetting agent is additionally added to the base formulation during the production of the COC foam. This wetting agent is indicated by black dots in the COC matrix or in the COC cell walls in the cross-sectional views of FIGS. 4c and 4d. The wetting agent reduces the phase boundary angle of polar liquids, in particular of water, to such an extent that the polar liquid flows without problems into the open cells.

FIG. 4e shows that the absorption of a nonpolar liquid in an open-celled COC foam can be stimulated, i.e., accelerated, without wetting agent and without pretreatment by a corona discharge or a corona-aerosol discharge. Here, the COC foam can have been produced either at an elevated temperature of 195° C. at the extrusion die or at the conventional temperature of 175° C., but then with addition of a foreign polymer.

Figure 4F:
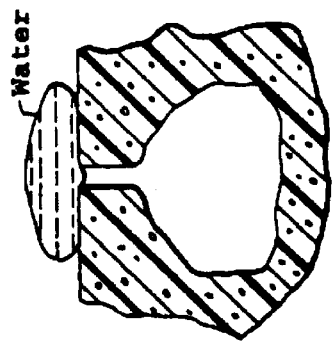

It can be seen from FIG. 4f that the polar liquid absorption in a COC foam containing wetting agent can be stimulated, i.e., accelerated, by a corona pretreatment. In the embodiments of the COC foam shown in FIGS. 4e and 4f, selective absorption of the nonpolar liquid (oil) or polar liquid (water) from a liquid containing both constituents occurs.

In one preferred embodiment, the plastic foam comprises as starting materials cycloolefin copolymer granules in an amount of about 87% by weight, a mixture of sodium bicarbonate and citric acid in an amount of about 0.5% by weight, butane in an amount of up to 2.7% by weight and crystalline polyethylene terephthalate in an amount of up to 10% by weight.

In another preferred embodiment, the base polymer is a cycloolefin copolymer and the foreign polymer is selected from the group consisting of polyethylene terephthalate, polymethyl methacrylate, polytetrafluoroethylene and polyurethane.

In another preferred embodiment, the plastic foam comprises as starting materials up to 99.75% by weight of cycloolefin copolymer granules, 0.15% by weight of a mixture of sodium bicarbonate and citric acid, 2.6% by weight of blowing agent selected from the group consisting of butane, propane and hydrogenfluoroalkanes, and 0.10% by weight of a mineral oil.

Some examples of open-celled COC foams having a foam density of 205–210 g/l are given below in Table 1. In Example A, the COC foam is produced using the standard formulation for the starting materials in the COC melt, i.e., COC granules in an amount of 96.7% by weight, Hydrocerol CF 70 as nucleating agent in an amount of 0.2% by weight, butane or a halogenated hydrocarbon as blowing agent in an amount of 3% by weight and a lubricant as the remainder. The temperature at the exit of the extrusion die is about 191° C. In Examples B and C, a foreign polymer is added in each case in an amount in the order of 10% by weight, while the proportion of the blowing agent is 2.30% by weight and the proportions of the nucleating agent and the lubricant are 0.5% by weight and 0.1% by weight respectively. The temperature of the die is 175° C. during the extrusion process. Accordingly, the proportion by weight of the COC granules in Example D is 93.7% by weight. In the Examples B to D, 0.1% by weight of lubricant, for example, a white mineral oil such as Medinol 85 from Witco, The Netherlands, is added in each case, as a result of which the COC foam obtained has a high selective absorption capability for polar or aqueous liquids. In Examples C and D, wetting agents such as alkylsulfonate have been additionally added in an amount of the order of 3% by weight.

In the Examples A to D, it is particularly note-worthy that an open-celled foam which is open-celled or open-pored on the one surface has been produced without additional mechanical treatment such as perforation being required. The foam was shaped by blow molding, with the outside having closed cells and the inside of the tubular plastic foam sheet being open-celled. The open-celled nature comes from the lower cooling of the inside in comparison with the outside.

TABLE 1

|  | A Standard formulation | B Selective absorption for oil-like liquids | C Selective absorption for aqueous liquids | D Selective absorption for aqueous liquids |
| --- | --- | --- | --- | --- |
| COC granules | 96.70% | 87.1% | 84.1% | 93.7% |
| Nucleating agent (e.g., sodium bicarbonate and citric acid) | 0.2% | 0.5% | 0.5% | 0.2% |
| Foreign polymer (e.g., PET) | — | 10% | 10% | — |
| Lubricant | 0.10% | 0.1% | 0.1% | 0.1% |
| Wetting agent | — | — | 3% | 3% |
| Blowing agent (e.g., alkanes such as butane, halogenated hydrocarbons) | 3% | 2.3% | 2.30% | 3% |
| Cell structure (fine) ≦ 0.4 mm | open | open | open | open |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Priority application German 195 38 160.2 filed Oct. 13, 1995 including the specification, drawings, claims and abstract, is hereby incorporated by reference.

What is claimed is:

1. A process for producing a plastic foam article comprising a thermoplastic synthetic foam which contains at least 10% by volume of open cells, said process comprising:

melting a polymer mixture comprising at least one cycloolefin homopolymer and/or copolymer and a nucleating agent which is an endothermic and self-nucleating blowing agent in a carrier and optionally a foreign polymer in a first extrusion step at a temperature of up to 320° C.;

injecting a blowing agent into the polymer melt under a high pressure of up to 350 bar at the end of the first extrusion step and mixing it homogeneously with the polymer melt;

cooling the polymer melt in a second extrusion step to a composition temperature which is determined, based on the composition of the plastic foam, to provide an open-celled foam upon extrusion.

2. The process as claimed in claim 1, wherein the nucleating agent comprises an endothermic and self-nucleating blowing agent on an LDPE carrier.

3. The process as claimed in claim 1, wherein at least one of the surfaces of the extruded plastic foam article is partly opened by mechanical treatment or by cooling and simultaneous stretching on exit from the second extrusion step.

4. The process as claimed in claim 1, wherein the open cells are formed by cooling the polymer melt, which does not contain a foreign polymer, in the second extrusion step to a composition temperature which is in the region of the lower limit of the pseudoplastic viscous temperature range directly prior to extrusion, wherein the composition temperature is from 10 to 20% higher than the composition temperature during extrusion of closed-cell plastic foams made of an identical mixture.

5. The process as claimed in claim 4, wherein the polymer mixture comprises the foreign polymer and a certain amount by weight of the cycloolefin homo- or co-polymer is replaced by an amount by weight of the same order of magnitude of the foreign polymer and the wettability of the foreign polymer in the cycloolefin homo- or co-polymer melt is virtually zero, and wherein the addition of the foreign polymer lowers the composition temperature to a temperature which is required in the extrusion of closed-cell plastic foams comprising cycloolefin homo- or co-polymers.

6. The process as claimed in claim 5, wherein the foreign polymer is selected from the group consisting of polyethylene terephthalate, polymethyl methacrylate, polyurethane and polytetrafluoroethylene, wherein the foreign polymer in the polymer melt results in opening of the cell walls without mechanical destruction of the webs of the cell walls.

7. The process as claimed in claim 5, wherein the foreign polymer is added as granules, masterbatch or powder and its proportion by weight in the polymer melt is from 0.15 to 15% by weight based on the polymer melt.

8. The process as claimed in claim 5, wherein at least one wetting agent comprising cationic, anionic, amphoteric or nonionic compounds is added to the polymer melt to reduce the phase boundary angle between a polar liquid and the cell walls of the plastic foam article.

9. The process as claimed in claim 8, wherein at least one wetting agent comprises alkyl sulfonate(s) and the metering in of the alkylsulfonate(s) occurs in masterbatch form and the proportion of the alkylsulfonate(s) in the polymer melt is from 0.1 to 10% by weight based on the polymer melt.

10. The process as claimed in claim 5, wherein one of the surfaces of the plastic foam article is subjected to a corona treatment, corona-aerosol treatment or molecular coating (MCS) to increase the absorption rate of polar liquids.

11. The process as claimed in claim 1, wherein the blowing agent comprises saturated, unsaturated or cyclic hydrocarbons, halogenated hydrocarbons, alcohols, water, nitrogen, carbon dioxide or mixtures thereof.

12. The process as claimed in claim 11, wherein the blowing agent is selected from the group consisting of methane, ethane, ethene, propane, propene, n-butane, 1-butene, 2-butene, isobutane, isobutene, n-pentane, isopentane, 2,2-dimethylpropane and cyclopentane.

13. The process as claimed in claim 12, wherein the blowing agent is a mixture of propane and n-butane in a weight ratio of from 30 to 80% by weight of propane to from 20 to 70% by weight of n-butane.

14. The process as claimed in claim 12, wherein the blowing agent is n-butane in an amount of from 2.10 to 4% by weight of the starting materials of the polymer melt.

15. The process as claimed in claim 3, wherein said mechanical treatment comprises scraping, scoring or perforating.

* * * * *